United States Patent [19]
Leibe

[11] Patent Number: 6,079,839
[45] Date of Patent: *Jun. 27, 2000

[54] LIGHTING DEVICE FOR DISPLAY OF GRAPHIC CHARACTERS

[76] Inventor: Thomas Leibe, Flemmingener Strasse 11b, D-04746 Hartha, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/945,064

[22] PCT Filed: Feb. 20, 1997

[86] PCT No.: PCT/DE97/00310

§ 371 Date: Dec. 10, 1997

§ 102(e) Date: Dec. 10, 1997

[87] PCT Pub. No.: WO97/30431

PCT Pub. Date: Aug. 21, 1997

[30] Foreign Application Priority Data

Feb. 20, 1996 [DE] Germany ............................ 196 06 179
Feb. 22, 1996 [DE] Germany ........................ 296 03 225 U

[51] Int. Cl.$^7$ ...................................................... F21V 7/04
[52] U.S. Cl. .............................. 362/31; 362/84; 362/298; 362/300
[58] Field of Search ................................ 362/31, 26, 298, 362/301, 300, 299, 84

[56] References Cited

U.S. PATENT DOCUMENTS

| | | | |
|---|---|---|---|
| 5,537,296 | 7/1996 | Kimura et al. | 362/31 |
| 5,617,251 | 4/1997 | Ohta et al. | 362/31 |
| 5,647,655 | 7/1997 | Kashima et al. | 362/31 |

FOREIGN PATENT DOCUMENTS 2720181  5/1994  France .

*Primary Examiner*—Thomas M. Sember
*Attorney, Agent, or Firm*—McAulay Nissen Goldberg Kiel & Hand, LLP

[57] ABSTRACT

A lighting device includes a body and one or more light sources that introduce light into the body. The one or more light sources include at least one strip-like source which continuously emits light with respect to its longitudinal direction. The body light has a light exit face on one side and by which light introduced into the body passes out of the body. The strip-like source is directly fitted on or in the body in such a way that the light which passes out of a side of the strip-like light source facing the body substantially completely enters the body. The body has a lateral face at least partly constructed as a mirror or reflector for light traveling in the body and at least partly to the light exit face.

15 Claims, 16 Drawing Sheets

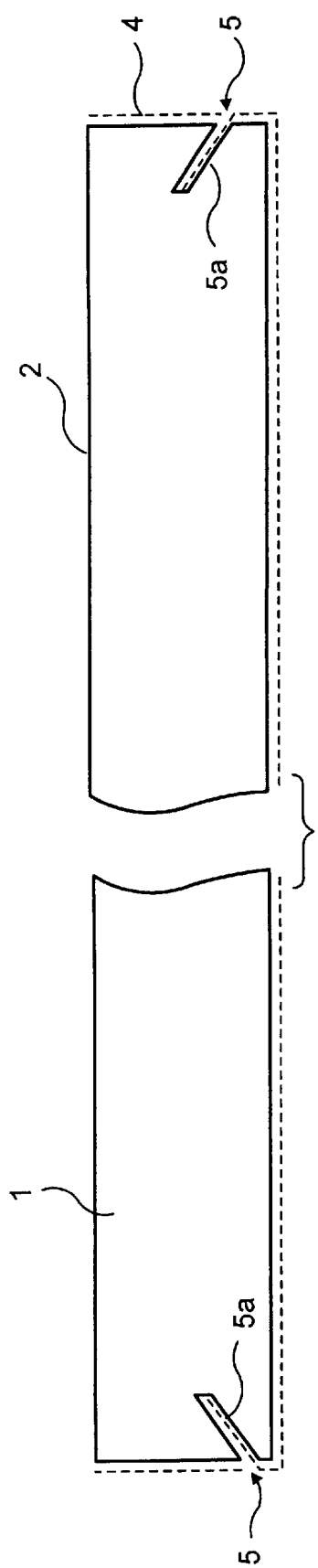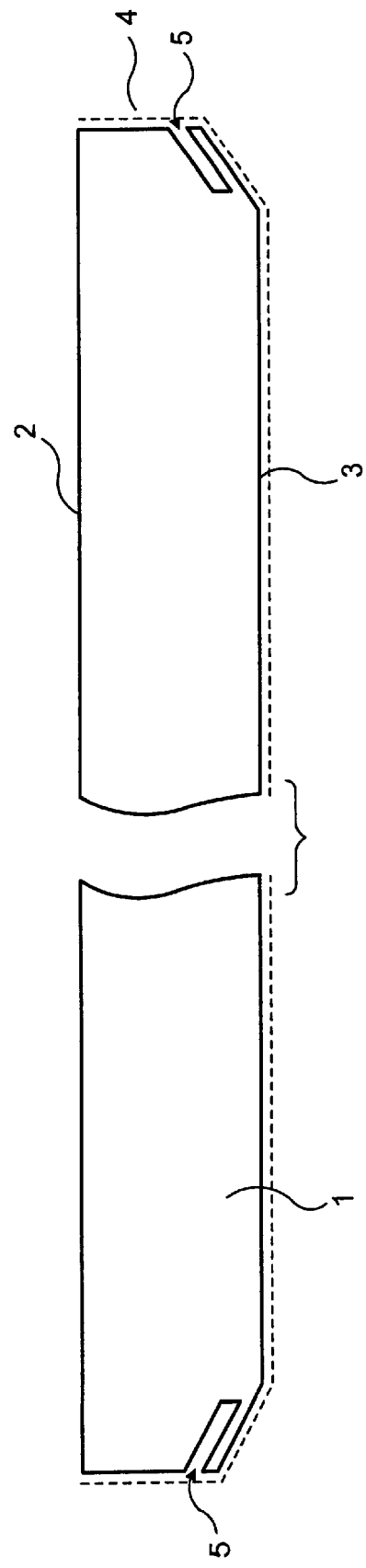

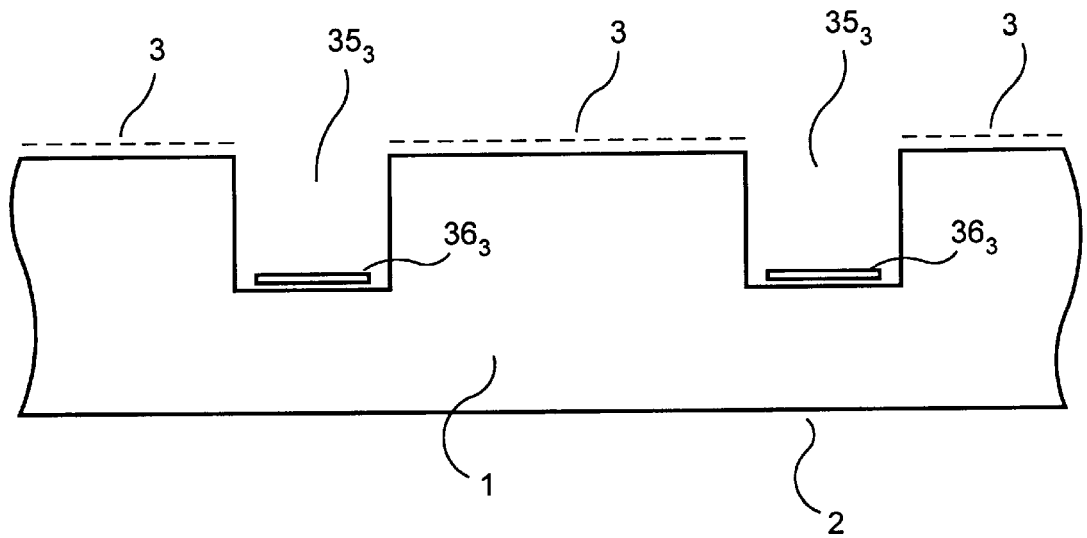
F I G. 9b
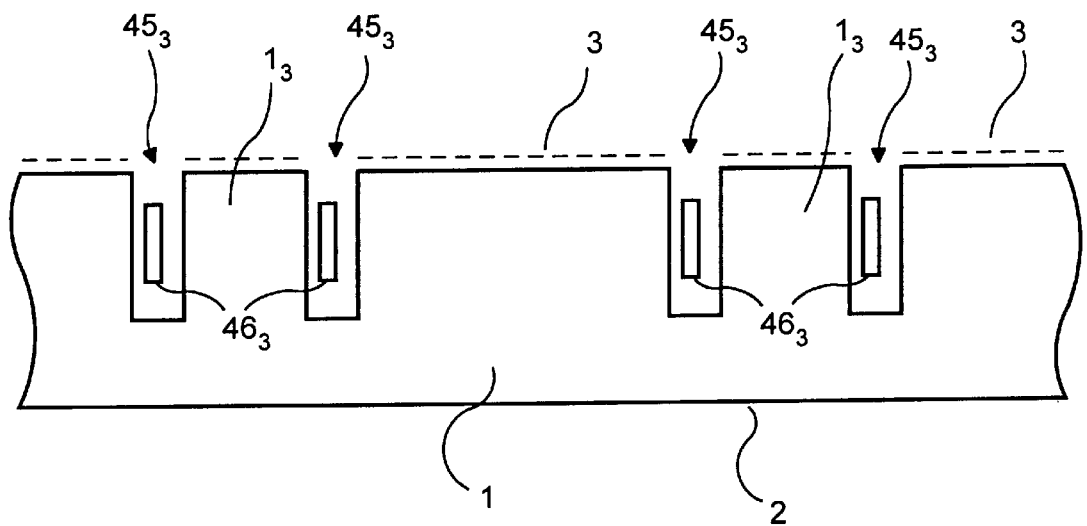
F I G. 10b

LIGHTING DEVICE FOR DISPLAY OF GRAPHIC CHARACTERS

BACKGROUND OF THE INVENTION

Field of the Invention

The present invention relates to a lighting or illuminatiug device, the preamble of claim 1. Such lighting devices are in particular, used in external advertising, emergency lights, fiber optic systems and displays. They generally comprise neon tubes, which are curved to the shape of a character to be displayed, groups or individual lighting means of known type. Such illuminated displays are expensive and susceptible to damage.

DESCRIPTION OF THE RELATED ART

Hitherto, in most methods known luminous means have been used. Hitherto the use of electroluminescent foils has been unsuccessful due to the low lighting efficiency thereof. An optimum utilization of the light produced is made possible through the combination, discussed in this patent specification, of introducing light into the body and the use of said light below the total reflection angle.

In conventional light sources light is emitted in all directions. If a strip-like light source is fitted to the edge of a flat lighting body with irradiation into the body or is embedded in the marginal area, a considerable part of the light leaves the body at the edge of the surface to be illuminated, giving rise to a visible, light edge or border.

This effect occurs in all known applications and arrangements, because in said area the light strikes the surface (light exit face) under an angle smaller than the total reflection angle and consequently largely emerges.

This natural property restricts the optimum utilization of the emitted light for the lighting effect in the entire lighting body area.

The possibilities of compensating this effect described in the present patent specification by means of a clearly defined arrangement of illuminating foils and/or a planned arrangement of reflection faces and/or radiants and consequently the possibility of using the light portion ignored in known lighting means and applications, represents an essential feature of the claim.

OBJECT AND SUMMARY OF THE INVENTION

The primary object addressed by the invention is the provision of a lighting device of the aforementioned type, which can be manufactured inexpensively, in frameless form and in shape or mold-independent manner, which is less susceptible to damage and which makes optimum use of the light emitted by the source.

According to the invention this object is attained by a lighting device with a transparent material body, one or more light sources, which introduce light into the body, and a light exit face on one or more sides of the body, by which light introduced into the body exit the body. A strip-like light source is so fitted to one side that the light passing out of the side of the strip-like light source facing the body substantially completely enters the body. A lateral face of the body is at least partly constructed as a mirror for light traveling in the body and reflects the light impinging thereon at least partly to the light exit face. For use as the material for the body of the lighting device plastics material, e.g. acrylic glass, which is resistant to breaking and impact, may preferably be employed. The lighting devices according to the invention have a longer life than the neon tube letters used in external advertising. It is also possible to use a low voltage power supply, which brings about an energy saving compared with neon tube lighting elements.

Further, according to the invention, the problematic effects of the related art noted above are compensated by a clearly defined arrangement of illumination fails and/or a planned arrangement of reflection faces and/or radiants and consequently the possibility of using the light portion ignored in known lighting devices represents an important feature thereof.

According to a first embodiment of the invention, the entire body is constructed in the form of a character, symbol, pictogram or letter to be displayed, the strip-like light source being preferably laterally fitted in the body and follows the contour of the character, luminous body or letter. The light exit face can be shaped like the character or letter to be displayed. According to a second embodiment, the light source is so fitted within the body, that on part of the light exit face appears the character or letter to be displayed. For this purpose the characters or letters to be displayed can be given a relief-like construction in the body, preferably on the light exit face or in mirror-symmetric manner on the back. In a first variant of this embodiment, the letter is given a depressed or recessed construction and in the resulting slot are fitted one or more strip-like light sources. In a second variant the letter or character is raised, so that it is surrounded by an all-round slot, in which are placed one or more strip-like light sources. The light sources embedded in this way in the body can be accessed from one side of the body via the corresponding slot or can be molded in said slot. Naturally such a lightiug or illuminating device with molded light sources can also be manufactured in that the light sources are given a configuration in a mold corresponding to the previously described arrangement in the slots and then the body is molded round the light sources. If the body is itself constructed in the form of the character or letter to be displayed, generally the strip-like light source is fitted in flat engaging manner either in a slot on the side of the body or on a planar lateral face of the body. However, it can also be integrated into the body by molding.

The material of the body can, on the light exit face, be transparent or diffuse scattering ("milky") and can also be colored in accordance with the intended use. The light source can be installed with a certain inclination, so as to direct most of the emitted light onto a mirrored face. The construction of one lateral face of the body as a mirror can take place by silvering or mirroring the face using known procedures, e.g. by vacuum deposition of a reflecting material, bonding on a reflecting foil or the like. As then light strikes an interface and a certain portion of light is reflected, a mirror effect can also be achieved by glazing the corresponding face. Appropriately said face is so positioned that most of the light impinging from a direction suitable for reflection to the light exit face is reflected.

According to the invention as a result of the strip-like light source, the light output with respect to the direction of the strip is more uniform, whereas the face constructed as a mirror forms a virtual light source, so that the light exit face is illuminated from a further side and consequently more uniformly. The body can have several faces constructed as mirrors, the mirror effect relating to the light travelling in the body, i.e. the light travelling in the body is reflected back into the body at the mirrored face.

The strip-like light source only emits a small portion of light at the narrow sides, whereas the mirror face, as a result of the directed reflection to the light exit face, reduces the absorption of light-absorbing faces of the body, so that overall the light efficiency is improved. Advantageously the mirror face guides a light bundle coming directly from the light source or from a not diffuse reflecting face, to the light exit face.

Advantageously, one wall of the body is constructed as a concave or convex mirror, e.g. by mirroring or silvering and reflects light coming from the light source or another mirror face, to the light exit face so that the thus reflected radiation covers a specific portion of the light exit face determined by the curvature and orientation of said wall portion and which can naturally also be the entire light exit face. The beam cone can be both expanded and contracted by the reflection.

Additionally or alternatively the previously described arrangement can be modified in such a way that at least part of the light impinging on the curved wall element is reflected by means of a second, preferably plane mirror to the light exit face.

The coupling out of light at the light exit face can be brought about in two different ways.

The strip-like light sources and the inwardly mirrored interfaces of the body can be set up in such a way that the light traveling in the body impinges on the light exit face under an angle larger than the angle of the total reflection $\alpha_T$. The light then only exits at the points of the light exit face with an irregular surface, because there, although the incidence angle is on average larger than the total reflection angle, the incidence angle can be locally smaller than the total reflection angle. Such an irregular surface can be obtained in known manner by etching, grinding or the application of a light scattering substance or foil.

Alternatively the light source and reflecting faces can be set up in such a way that the light emitted or reflected by them at least partially impinges on the light exit face under an angle which is smaller than the total reflection angle, so that it partly exits from the body. However, as a specific portion of the light is reflected back into the body, it is advantageous to provide, facing the light exit face, a parallel, mirrored face, which optionally together with further mirrored faces of the body returns the light again to the light exit face.

It can be disadvantageous for certain applications that light coming directly from the light source exits the light exit face. This more particularly applies if the strip-like light source comprises several single light sources and the distance from the light source to the light exit face is too small, so that the light cones of the single light sources can overlap at the light exit face. For such cases the light source can be so set up through a suitable orientation or conventional beam-limiting means, that the light emitted by it and which passes to the light exit face without prior reflection, impinges there under an incidence angle larger than the total reflection angle.

The lighting device according to the invention has a solid body, which can in particular be made from plastic, which can be easily molded and worked. It can therefore be easily manufactured even with complicated shapes.

As strip-like light sources are available on the one hand strip-like printed circuit boards, to which are applied using SMD technology a tight, compact arrangement of light-emitting diodes. However, on the other hand strip-like light sources exist formed from electroluminescent foil, which produce over their length continuous light, e.g. the material known under the trade name Super Neo-Neon (SNN) described in U.S. Pat. No. 5,845,752.

BRIEF DESCRIPTION OF THE DRAWINGS

In the drawings:

FIGS. 6a to 6j show different configurations of a slot for receiving the strip-like light source.

FIGS. 9a & 9b illustrate a rear view or a partial sectional view of a first variant of the second embodiment of the invention.

FIGS. 10a & 10b show a rear view or a part sectional view of a second variant of the second embodiment of the invention.

DESCRIPTION OF THE PREFERRED EMBODIMENT

Figure 1:
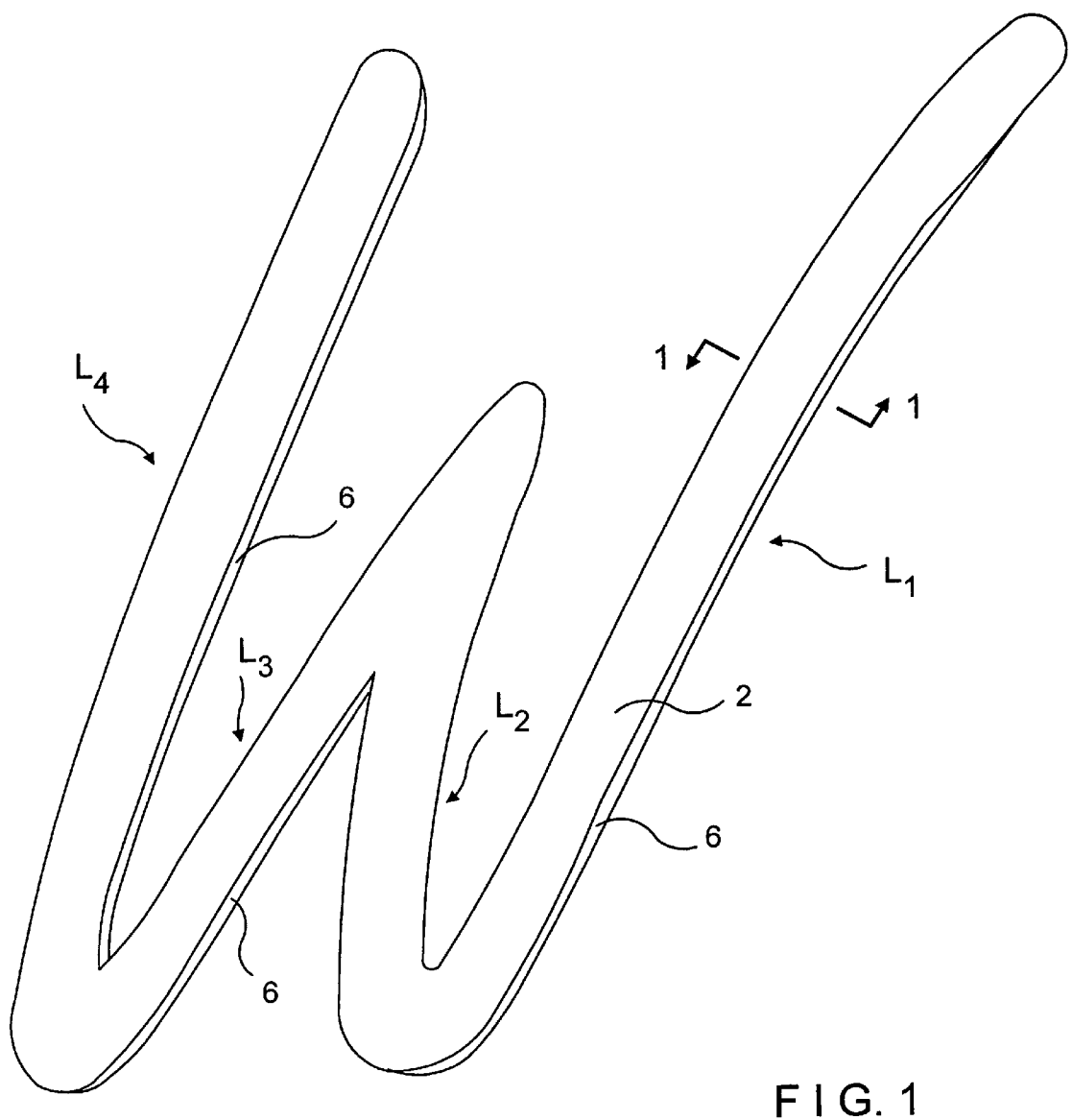
FIG. 1 illustrates a first embodiment of the invention.

In the following description identical or identically acting elements of the lighting or illuminating device according to the invention are given the same reference numerals. Mirrored or silvered faces are indicated by a broken line parallel to a continuous or through line.

FIG. 1 shows an example of a first embodiment of the inventive lighting or illuminating device in the form of a letter W. The view of FIG. 2 corresponds to a section perpendicular to the broken line of the letter, e.g. along line I—I in FIG. 1.

The lighting or illuminating device essentially comprises a body 1 made from a transparent material, e.g. acrylic glass, which is resistant to impact and breakage and which can be clear or opaque. The body has two planar, parallel limiting faces 2 and 3, which are joined by side walls 4. In each of the side walls is formed a transparent slot 5, e.g. by laser cutting or milling with following polishing and in which extends a strip-like low voltage light source 6. This light source can e.g. be a strip of electroluminescent film or foil (e.g. SNN) and preferably has on the side of the body or on its back not shown power supply terminals. The slot 5 and strip-like light source 6 extend in a direction perpendicular to the sectional plane along the side of the body and preferably pass around the complete letter. Through the insertion of the light source 6 in the transparent slot it is ensured that substantially the entire usable light efficiency of the strip-like light source 6 enters the body 1.

The face 2 forms the light exit face of the body and can have a roughened portion. The face 3 facing the light exit face 2 is inwardly mirrored, so that it reflects light, propagated in the body 1, to the light exit face 2.

The light emitted by the light source 6 partly strikes the mirrored face 3 and partly the light exit face 2. The light striking the light exit face 2, to the extent that the incidence angle $\alpha$ is larger than the total reflection angle $\alpha_T$ passes out with the intensity $$I_T = I_o \cdot \sin^2(\alpha - \alpha_T)$$

and is reflected with an intensity $$I_R = I_o \cdot \cos^2(\alpha - \alpha_T)$$

$I_o$ being the intensity of the incident light. Light which impinges on the light exit face with an incidence angle $\alpha$ higher than the total reflection angle $\alpha_T$ is completely reflected.

The light reflected on the light exit face 2 travels to the mirrored face 3, which reflects it back to the light exit face 2 in the same way as the light striking it directly from the light source 6.

During reflection between parallel faces, the incidence angle at one face remains the same during successive reflections. In order to bring about a light exit of that portion of light initially impinging on the light exit face 2 with an angle higher than the total reflection angle, in a variant of the embodiment shown in FIG. 1, the mirrored face 3 can be inclined against the light exit face, so that the incidence angle at the light exit face 2 changes in the case of repeated reflections. However, a light exit can also be achieved through a roughened portion, in the manner represented under 2' in FIG. 1, in that the orientation of the surface statistically varies, so that light, which with respect to the mean orientation of the light exit face 2 has an incidence angle higher than the total reflection angle, locally has an incidence angle which is smaller than the total reflection angle. The same effect can be achieved through a diffuse scattering coating of the light exit face 2 or the use of a diffuse scattering material for the body 1. In a preferred embodiment of the invention, the light exit face 2 is completely covered with a diffuse scattering, e.g. coloured foil.

Figure 2:
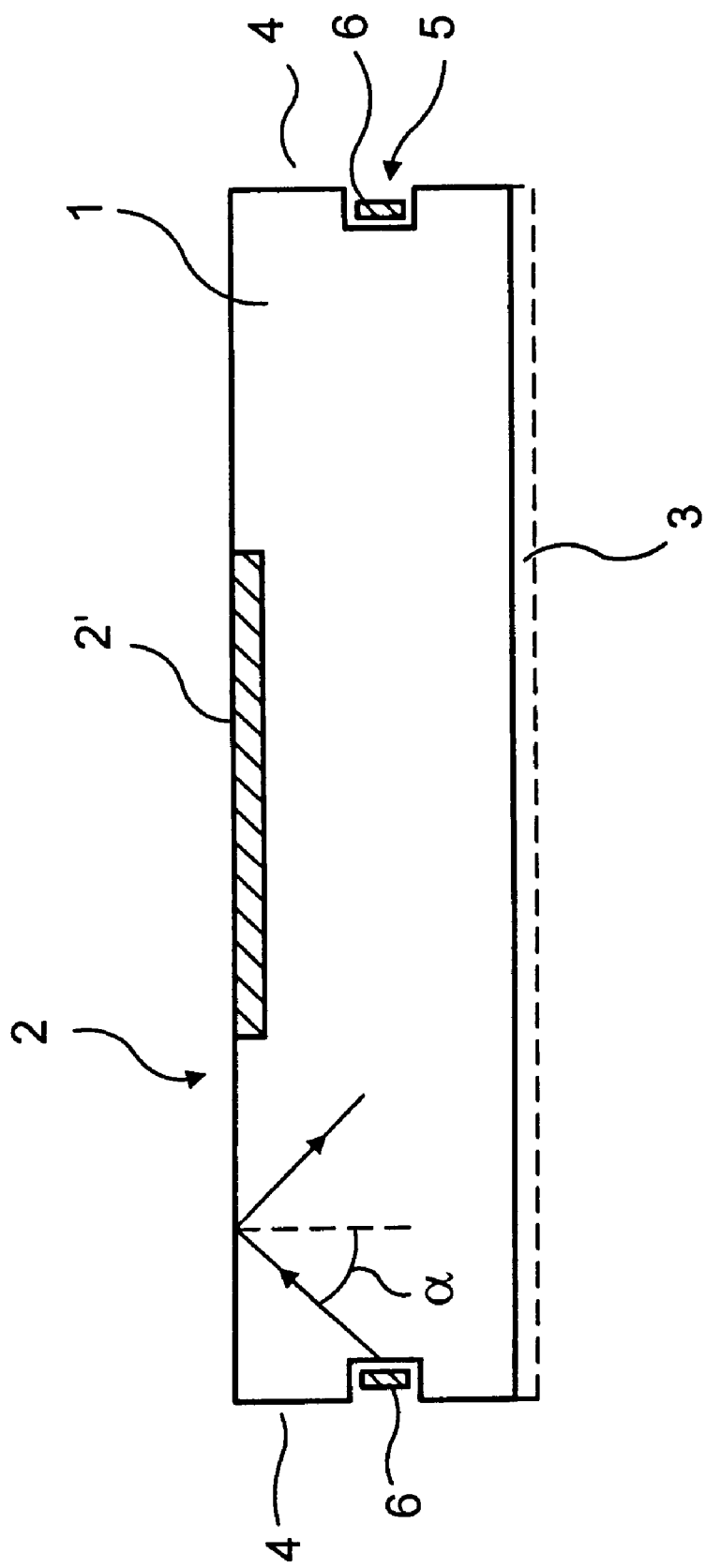
FIG. 2 provides a cross-sectloal view of a first variant of the first embodiment of the invention.

In the embodiment of FIG. 2 with parallel faces 2 and 3, it is possible to provide a beam-limiting device, e.g. a screen or mask, so that the incidence angle of the light from the light source 6 is higher than the total reflection angle at the light exit face 2 and at the reflecting face 3. In this case light can only emerge in the diffuse scattering portion 2', whereas in the remaining area of the light exit face 2 the light is totally reflected.

Figure 3:
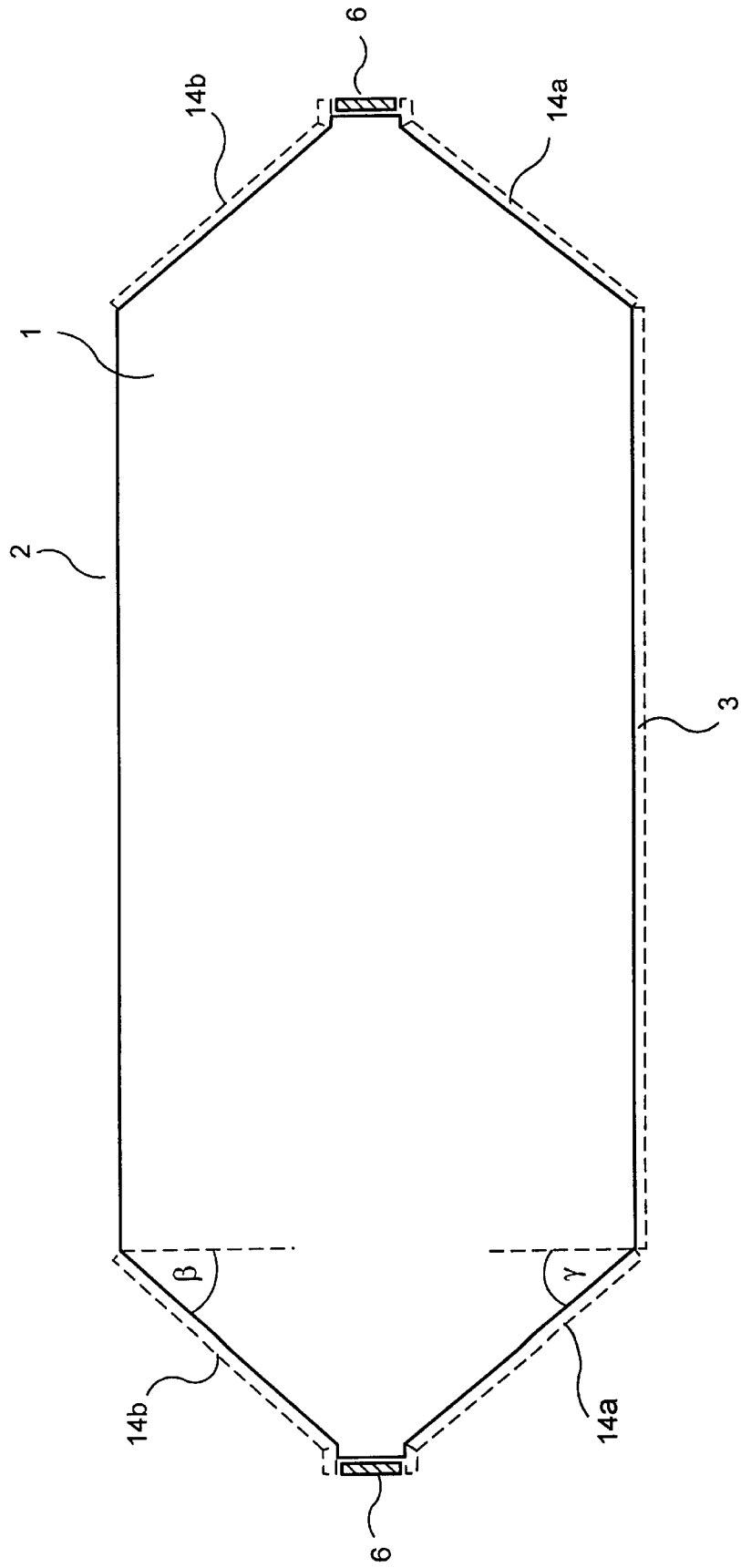
FIG. 3 provides a cross-sectional view of a second variant of the first embodiment of the invention.
Figure 4:
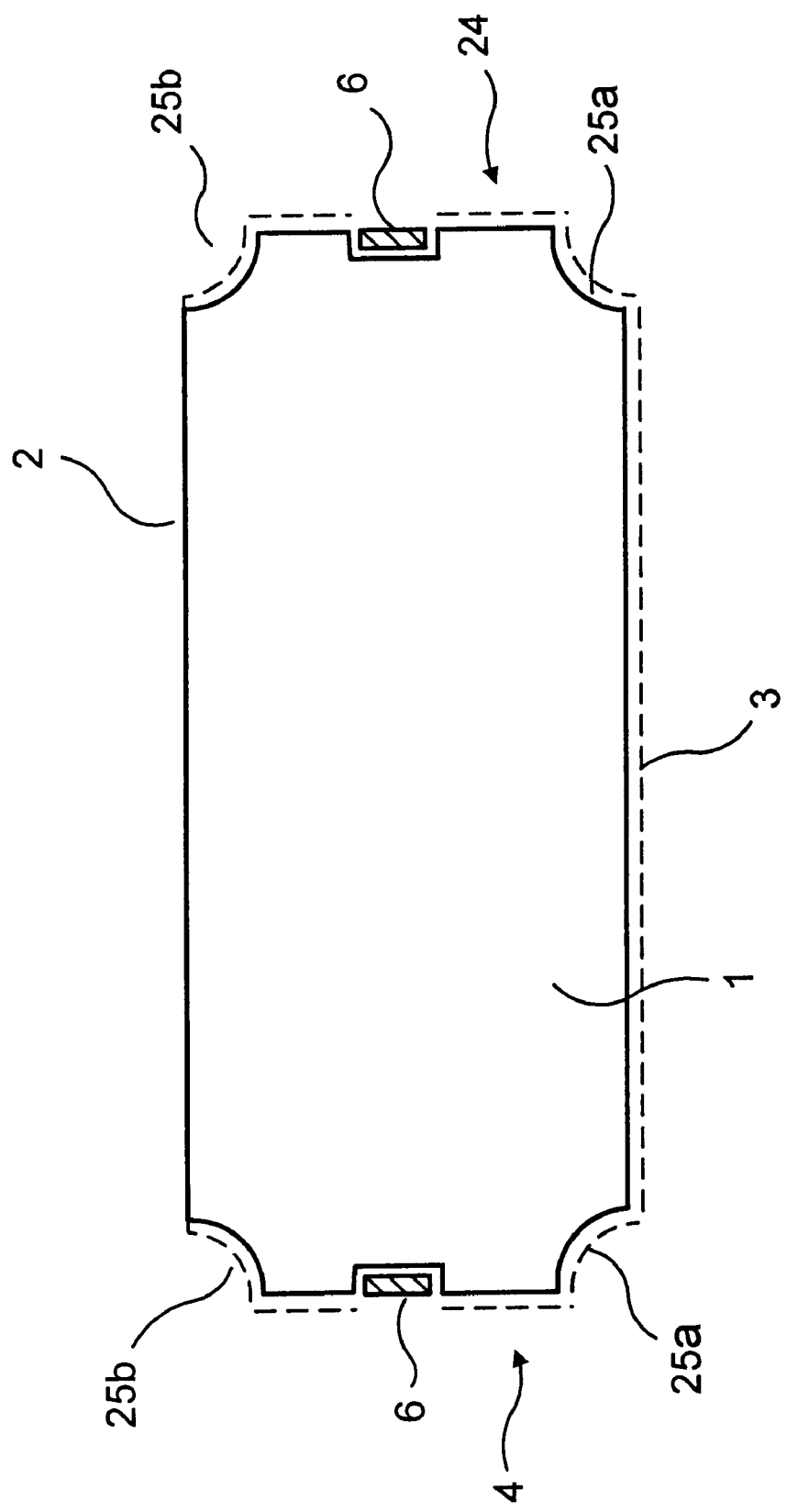
FIG. 4 provides cross-sectional view of a third variant of the first embodiment of the invention.

FIGS. 3 to 5 show in cross-section variants of the illuminating letter shown in FIG. 1.

In the variant of the embodiment of FIG. 1 shown in FIG. 3, apart from the face 3, the side walls 14a and 14b are mirrored and inclined with respect to the light exit face 2 or reflecting face 3. With an appropriate choice of the angles of the lateral faces 14a, 14b to the normal of the light exit face 2 or reflecting face 3, $\beta$ or $\gamma$, light which initially impinges with an angle greater than the total reflection angle on the light exit face 2, following one or more reflections on one of the sides 14a, 14b impinges on the light exit face 2 under an angle smaller than the total reflection angle. As mirrored walls 14a, 14b are provided on both sides of the body, the light can pass several times round within the latter, the incidence angle at the light exit face differing during each revolution in the case of a corresponding choice of the angles $\beta$ and $\gamma$.

For an exclusive coupling out of light on uneven portions of the light exit face 2, as described hereinbefore relative to FIG. 2, the angle between the side walls 14a and 14b is chosen as 90°, so that a beam of light, following a reflection on both mirrors, travels back parallel to its original direction. In addition, the angle $\beta$ is chosen larger than the total reflection angle, so that light reflected on the face 14a always impinges on the light exit face 2 with an angle greater than the total reflection angle. Finally, the light source 6 is so positioned that the mirrored walls 14a and 14b act as a screen, which prevents the direct incidence of light on the light exit face with an angle smaller than the total reelection angle. In this case the face 3 need not be mirrored, provided that it is parallel to the light exit face 2, because also on this face the light impinges with an incidence angle greater than the total reflection angle.

In the variant of the first embodiment shown in FIG. 4, once again the face 3 facing the light exit face 2 and the side walls 24a, 24b are mirrored. However, the side walls have in the edge regions wall portions 25a and 25b constructed as convex mirrors and whose function is to reflect the light striking the edge regions directly to the light exit face 2 or the reflecting face 3 and to distribute the same over a specific surface area. A corresponding optical path is shown in exemplified form in FIGS. 5a and 5b.

Figure 5A:
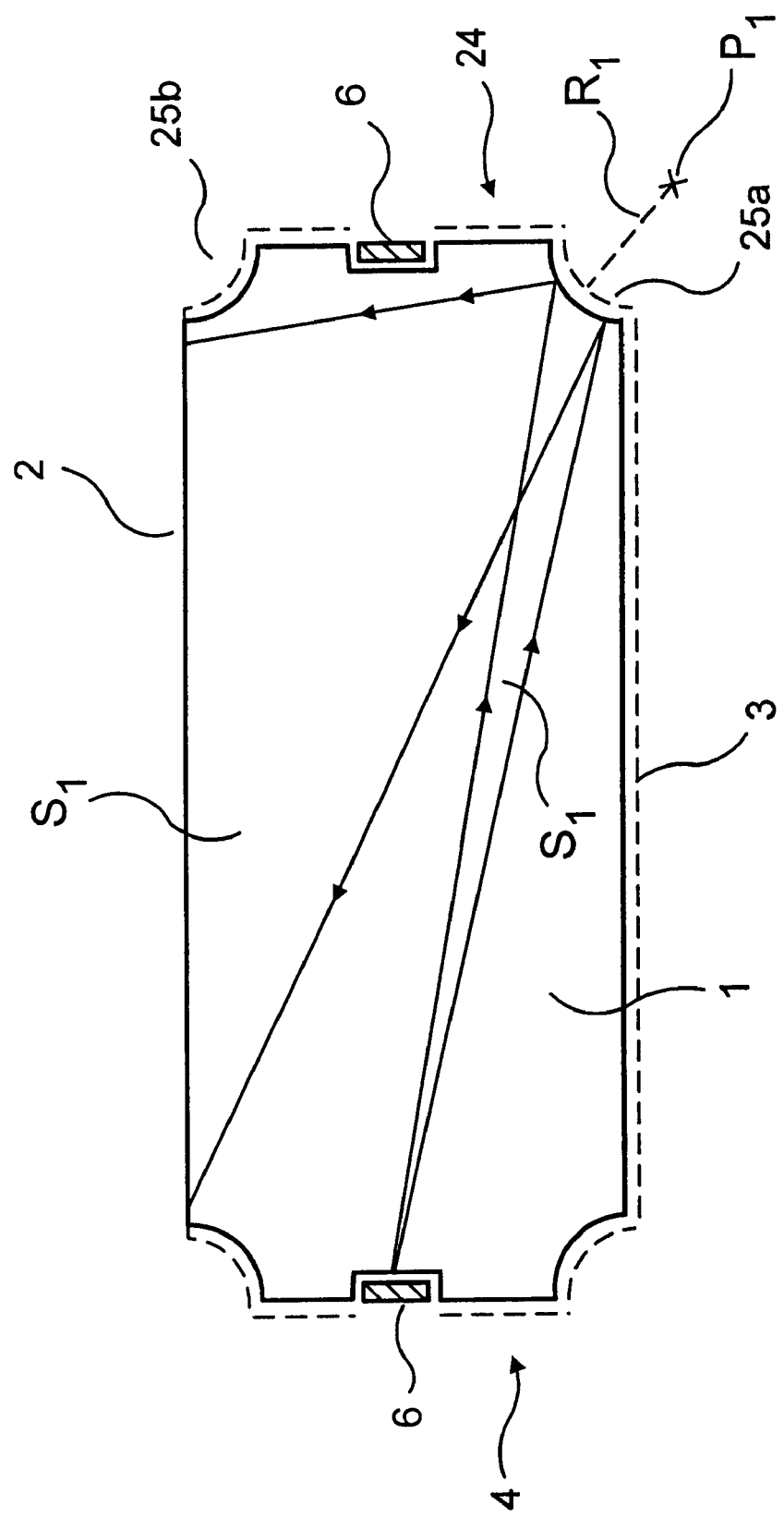
FIGS. 5a & 5b shows a sectional view part of the optical path the third variant of the first embodiment of the invention.

FIG. 5a illustrates the function of the mirrored wall portion 25a. The light bundle S1 impinging from the light source 6 on the wall portion 25a is reflected by the latter and is so expanded that it covers the entire light exit face 2. In a similar manner, light reflected under a large angle of emergence on the face 3 is reflected via the wall element 25a to the light exit face 2. The degree of expansion of the beam bundle S1 is dependent on the degree of curvature of the wall element 25a. With a correspondingly large radius of curvature $R_1$ and corresponding position of the centre of the circle of curvature $P_1$ for the incidence range, the beam bundle S1 only covers part of the light exit face, which can be advantageous if certain areas of the light exit face are to be more strongly illuminated.

Figure 5B:
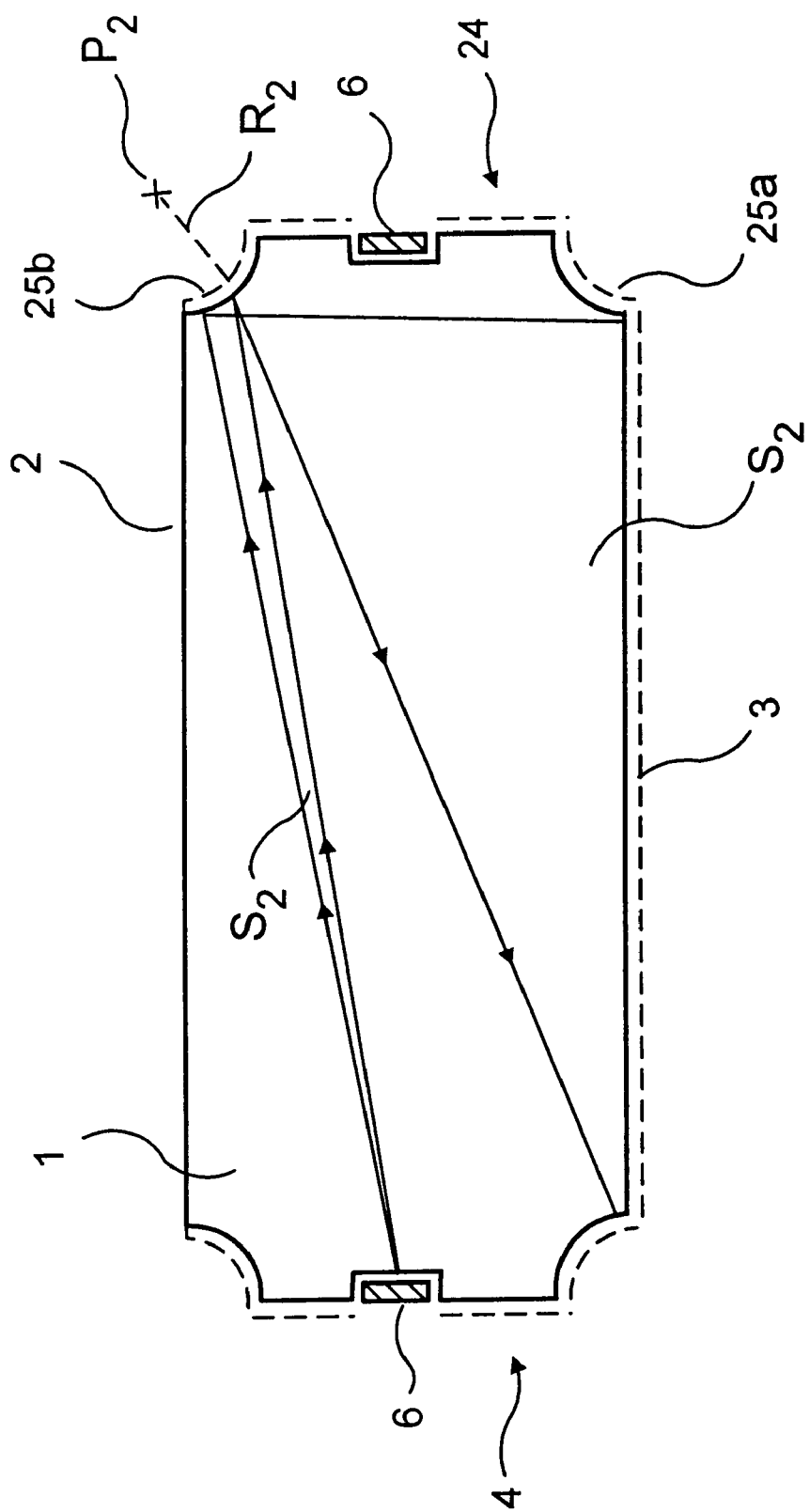

The operation of the mirrored wall portion 25b is diagrammatically represented in FIG. 5b. The light bundle S2 coming from the light source is reflected by the wall element 25b, so that it is expanded and covers essentially the entire reflecting face 3. The face 3 then reflects part of this light to the light exit face. The radius of curvature R2 and the centre of the corresponding circle of curvature P2 can also be chosen in such a way that the bundle S2 falls in a portion of the face 3 in which it is completely reflected to the light exit face 2. Light reflected under a large angle at the light exit face 2 is reflected by the wall element 25b to the face 3.

In the case of symmetrical construction, as shown in FIG. 4, the four mirrored portions 25a, 25b preferably have a circular curvature and identical radii of curvature.

In the embodiments of the inventive lighting device shown in FIGS. 2 to 5, in each case two strip-like light source face one another. However, it is alternatively possible to use only one light source on one of the two sides and to mirror the facing side wall, so that a virtual light source is produced on this side. Moreover, in the angle regions of a letter a mirroring effect can be provided in place of the light source 6 and the strip-like light source is only located on the straight or slightly curved portions of the body 1, e.g. along the portions L1–L4 in FIG. 1.

As explained hereinbefore by means of the different embodiments, the mirrored surface elements provided on the body can be varied and combined in numerous different ways. However, the lighting device according to the invention can also be modified in other respects.

Figure 6C:
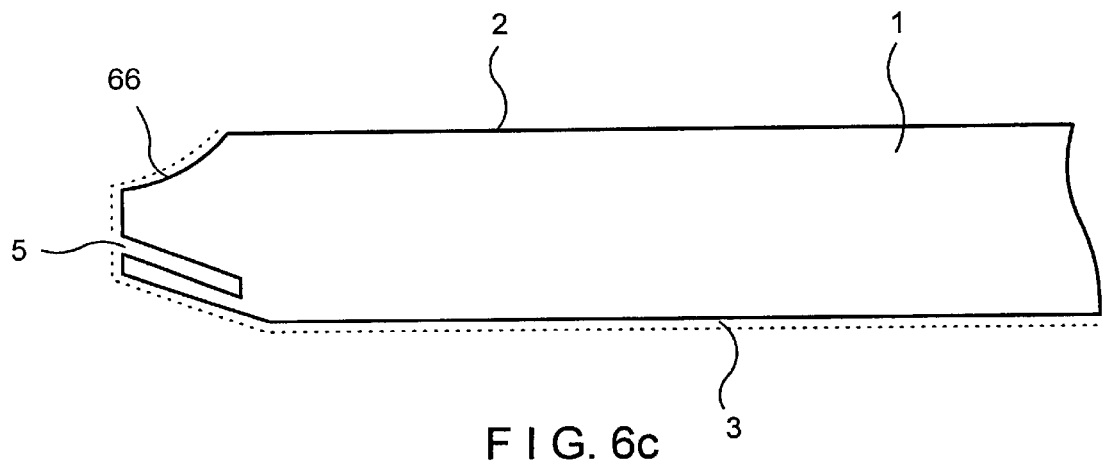
Figure 6D:
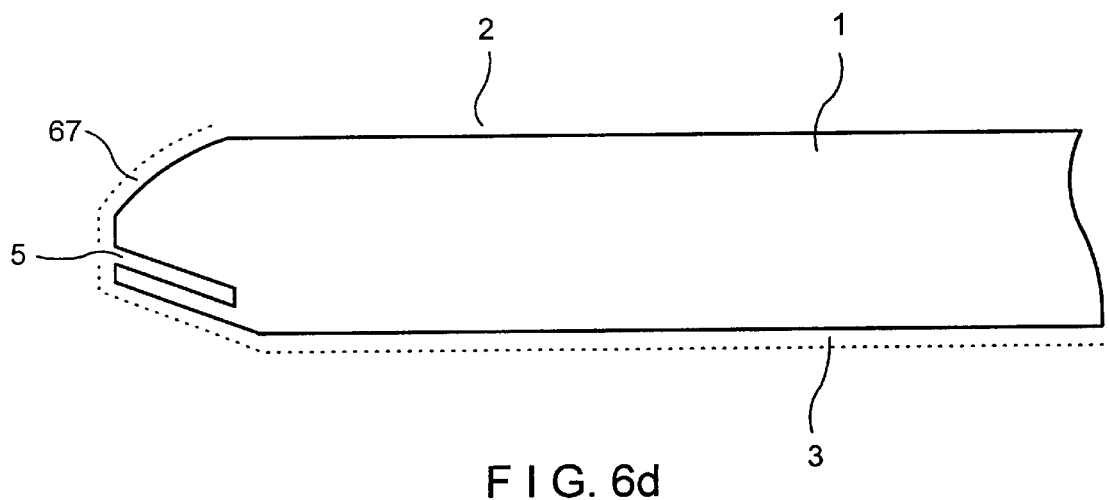

FIGS. 6a to 6j show diagrammatically numerous possible configurations of the slot 5 provided for the reception of the strip-like light source. Thus, e.g. and as is shown in FIGS. 6a and 6b, where the light source is not shown for reasons of simplicity, said slot is inclined, so that it can more strongly direct the light emitted by the light source to the light exit face 2 (FIG. 6b) or to a mirrored face, e.g. the lateral face 4 in FIG. 6a. In this way, the light emitted by the light source can be supplied in planned manner to a wall portion of the body constructed as a collecting or convex mirror. FIG. 6c shows a partial view of a corresponding body (without light source) with a wall portion 6c constructed as a convex mirror and FIG. 6d shows a corresponding view of a body 1 with a portion 67 constructed as a collecting mirror. In the case of the slot 5, if light is substantially only emitted in one direction from the strip-like light source, a lateral face 5a can be mirrored, in order to prevent an emergence of light from the body and into the slot, as represented in FIG. 6a.

Figure 6E:
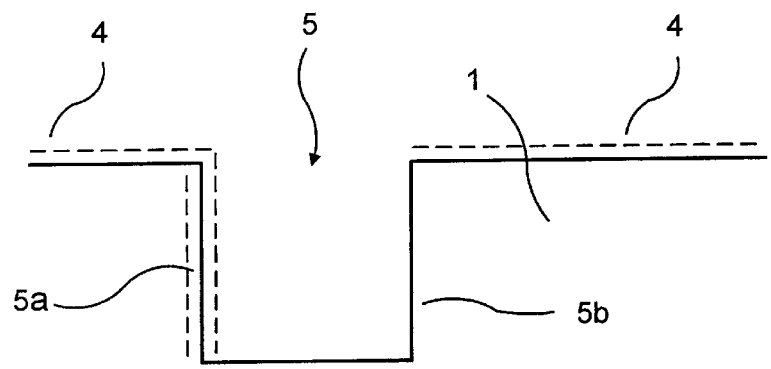
Figure 6F:
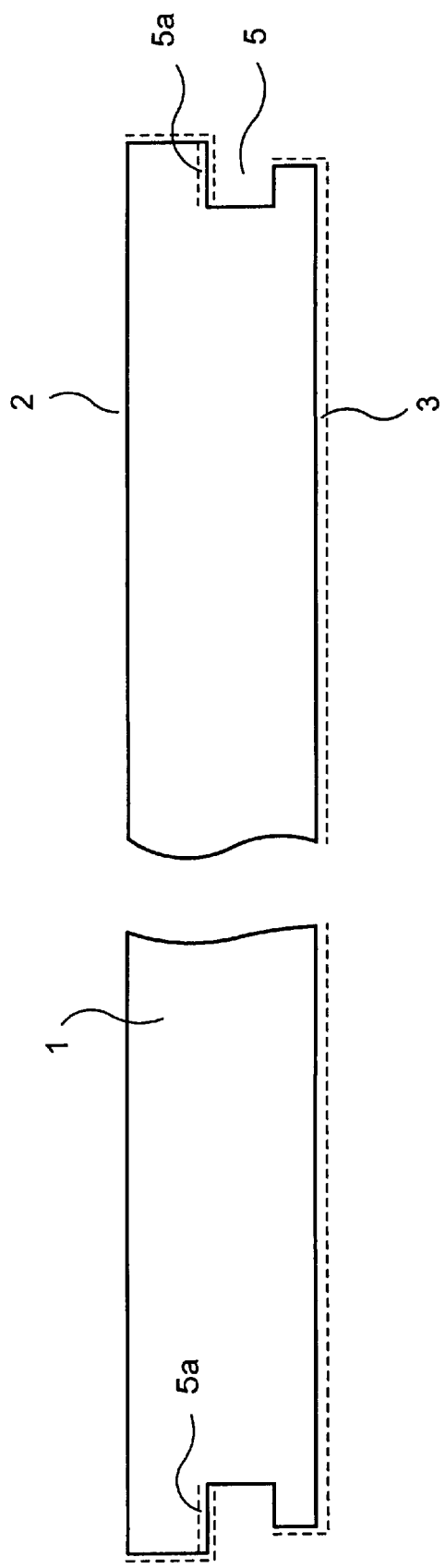

FIG. 6e shows in a partial view a slot 5, in which a side wall 5a is mirrored to the outside and inside, so that light emitted by the light source and striking the face 5a, is reflected to the opposite face 5b. FIG. 6f shows a double-mirrored face 5a in conjunction with an asymmetrical slot 5.

Figure 6G:
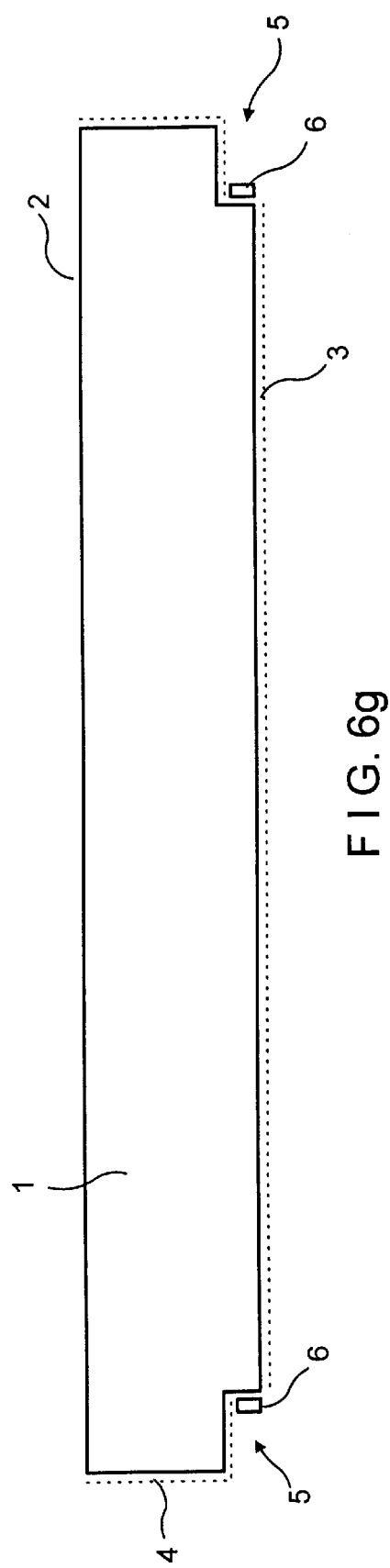
Figure 6H:
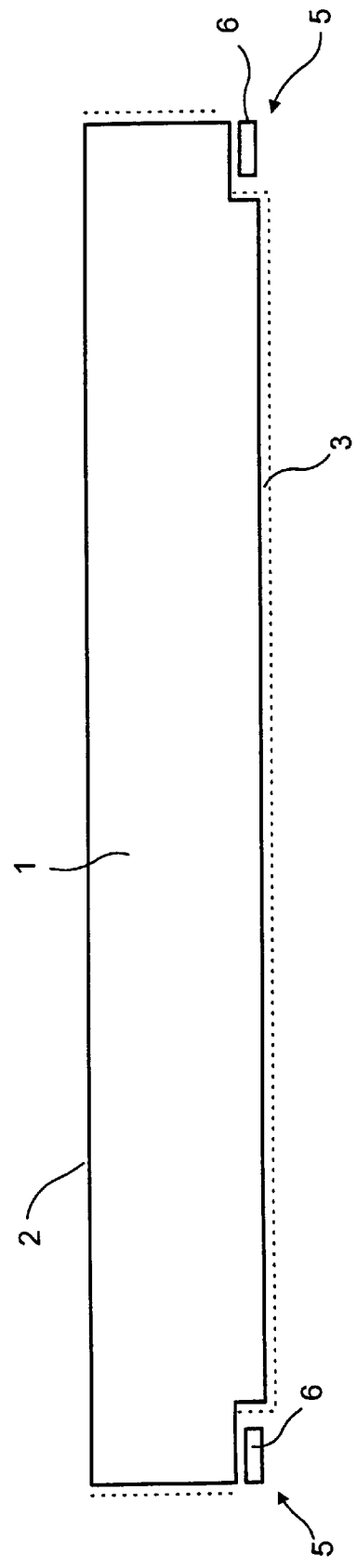
Figure 6I:
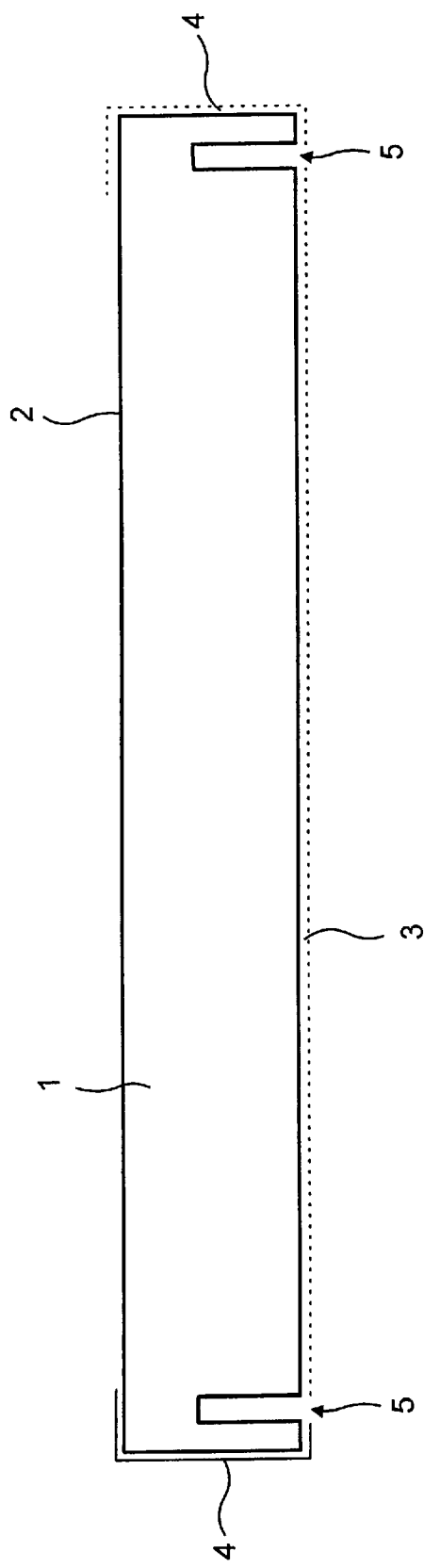
Figure 6J:
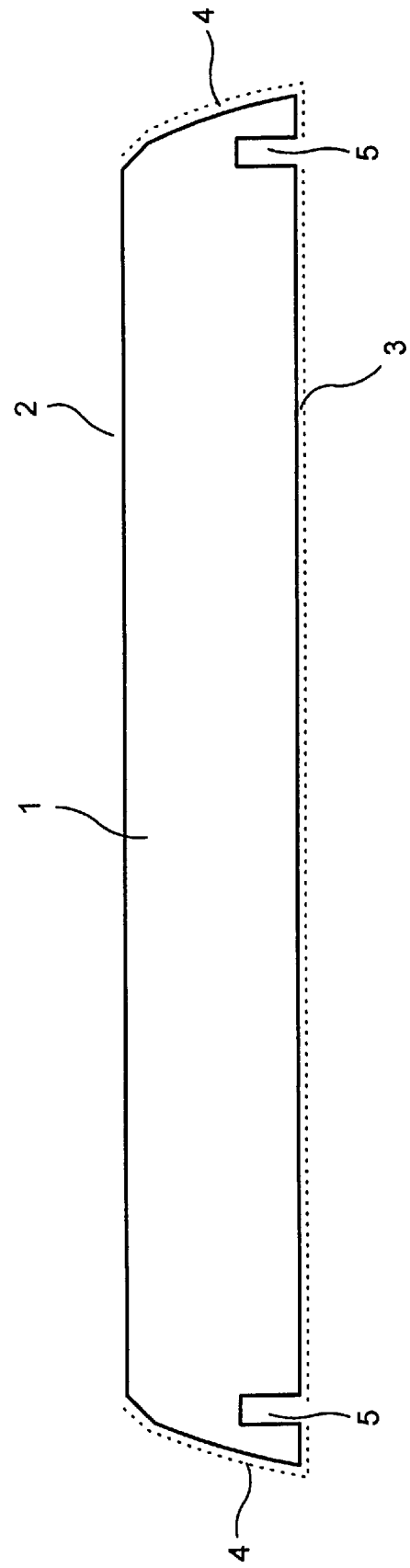

The slot can also be steplike (cf. FIGS. 6g and 6h). With such a steplike design, the strip-like light source 6 can be positioned parallel to the light exit face 2 (FIG. 6h) or parallel to a lateral face 4 (FIG. 6g). The slot 5 can also be constructed in the reflecting face 3 (FIGS. 6i and 6j). So that use can be made of light entering the space area between slot and side wall 4, the latter can be bevelled in the manner shown in FIG. 6j.

Figure 7A:
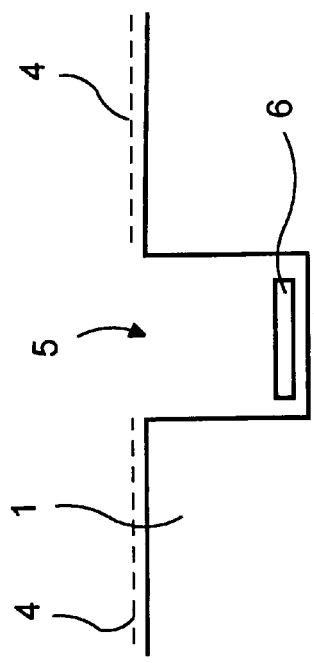
FIGS. 7a to 7d illustrate different arrangements of a strip-like light source in a slot of the body.
Figure 7B:
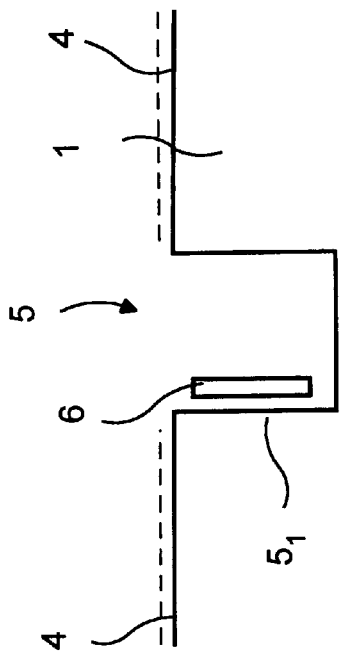
Figure 7C:
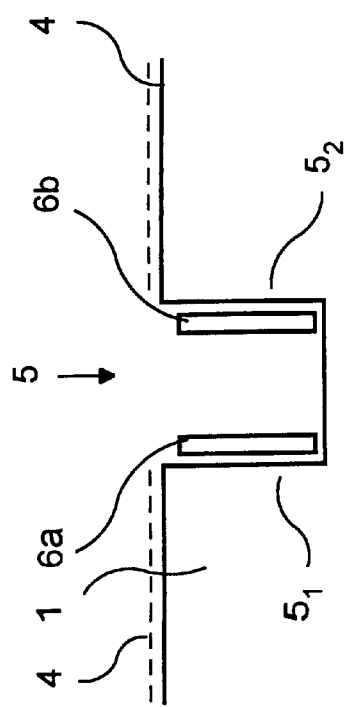
Figure 7D:
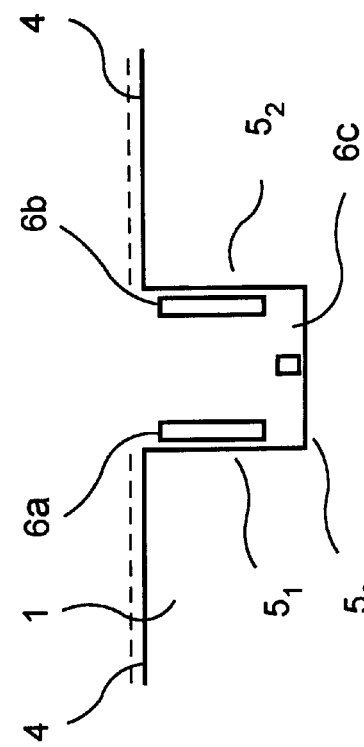

FIGS. 7a to 7d show different arrangements of the strip-like light source 6 in slot 5 in a partial view. The light source 6 can be positioned parallel to the bottom $5_3$ of the slot (FIG. 7a) or parallel to a lateral face $5_1$ of the slot (FIG. 7b). There can also be two parallel strip-like light sources 6a, 6b in each case parallel to the side walls $5_1$ and $5_2$ of the slot 5 (FIG. 7c). It is finally possible to have strip-like light sources 6a to 6c parallel to all three sides of the slot $5_1$–$5_3$ (FIG. 7d).

Figure 8:
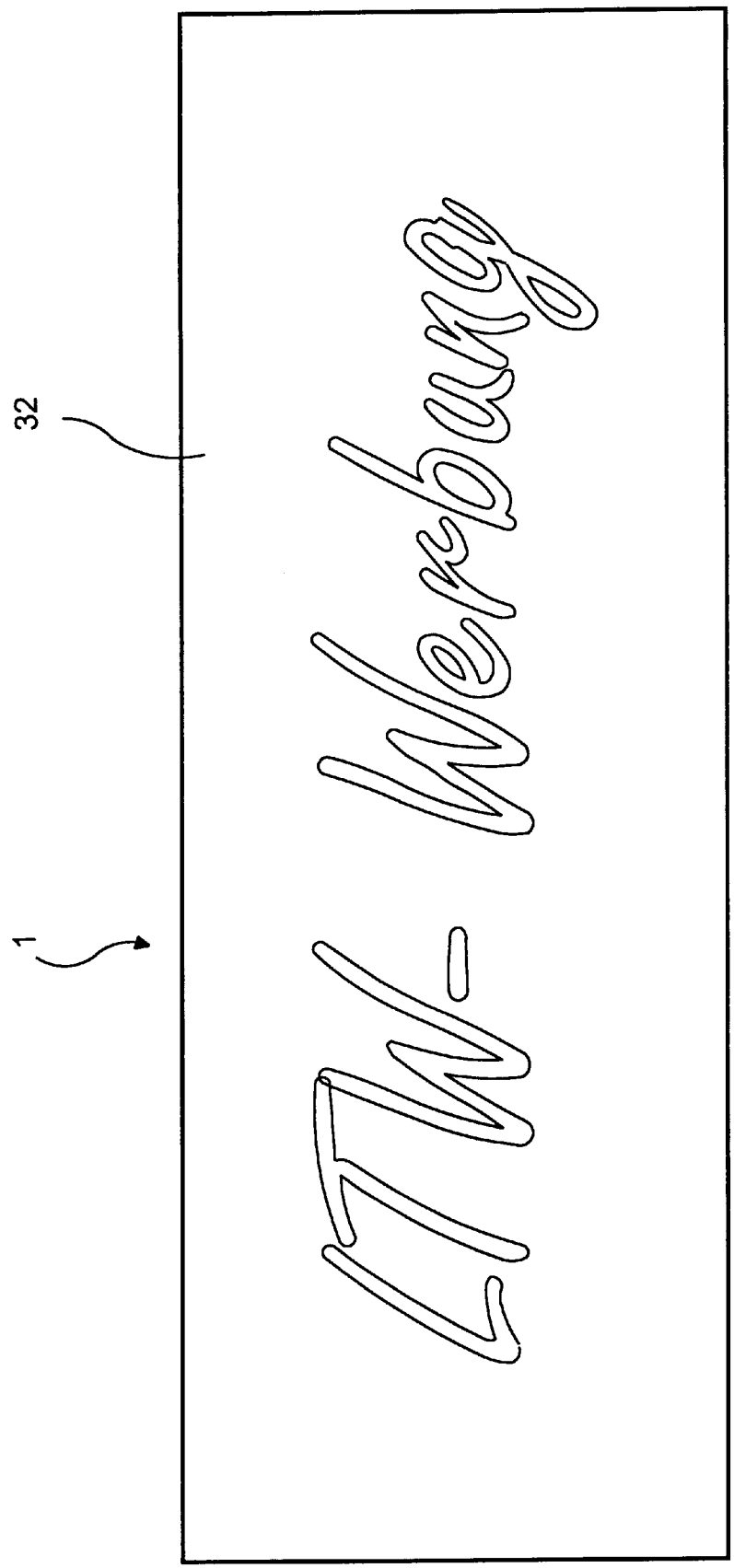
FIG. 8 shows a front view of an example of a second embodiment of the invention.

In a second embodiment of the invention, the light exit face is not in the form of a character to be displayed. Instead it has a single, e.g. rectangular face 32, as shown in FIG. 8, on which the character to be displayed is set off in dark or light manner during the operation of the device. This optical contrast is produced in that the strip-like light source in the form of the character to be displayed is embedded in the body 1. In a first variant of the second embodiment the strip-like light source substantially fills the character, i.e. the observer essentially sees the luminous strip of the light source as a character. In a second variant of the second embodiment the strip-like light source passes around the outline of the letter, i.e. the observer sees the area of the light exit face, which corresponds to the space area of the body enclosed by the strip-like light source in a form appearing lighter than the remainder of the light exit face. Using the same principle it is also possible to obtain a negative representation of the character and in this case the light emission of the strip-like light source is essentially in a direction away from the character.

Figure 9A:
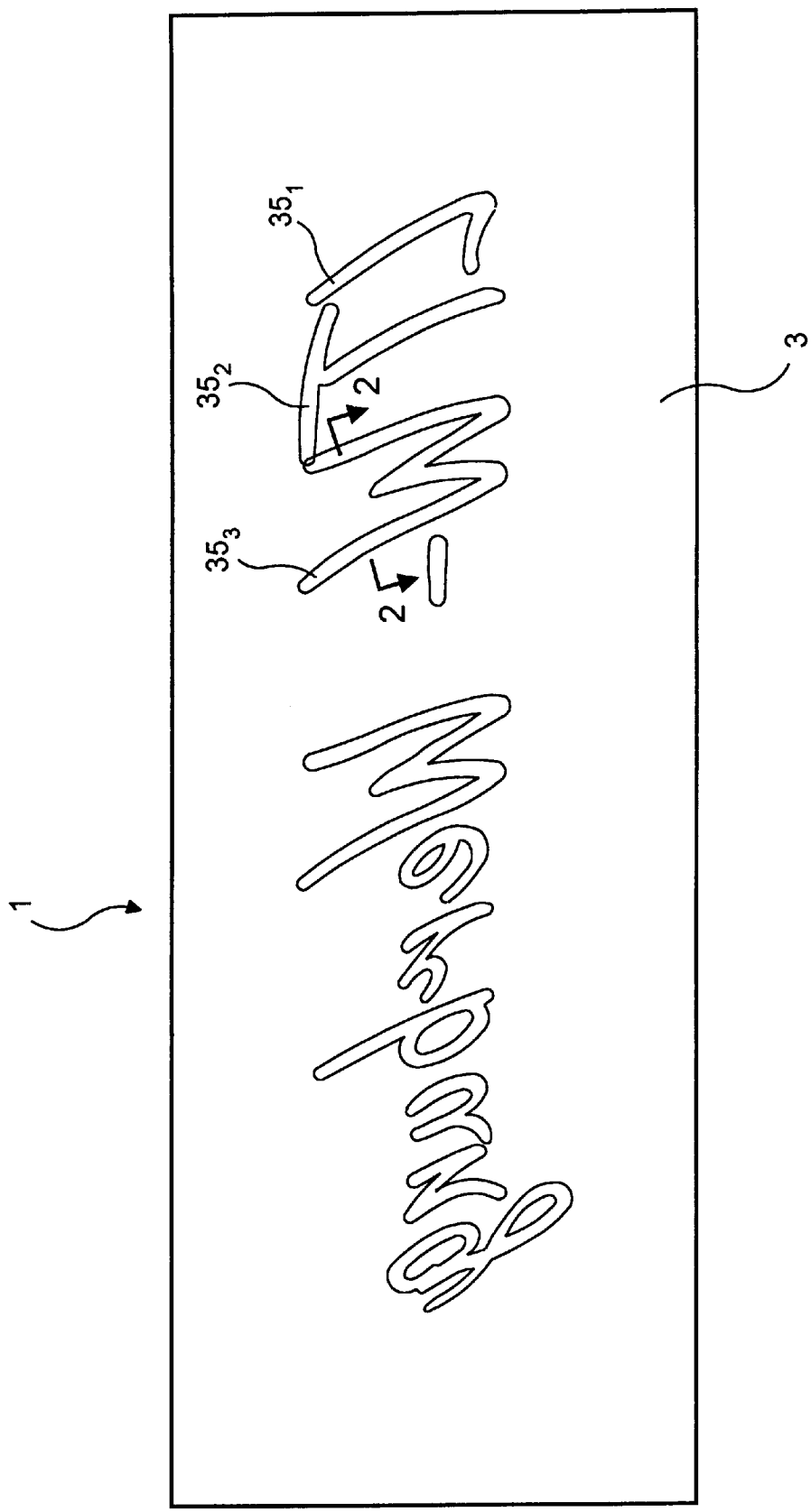

FIG. 9a shows a rear view of an example of the first variant, where slots $35_1$, $35_2$, $35_3$ in the form of mirror-symmetric letters are formed in the mirrored rear wall 3 of the body 3. Along said slots are in each case provided strip-like light sources $36_1$, $36_2$, $36_3$, as can best be seen in FIG. 9b and which represents a part sectional view along line II—II in FIG. 9a. In order to achieve a three-dimensional effect, it would also be possible to arrange several light sources along the three sides of slot 35i in accordance with the configuration shown in FIG. 7d. Provided that the strip-like light sources emit adequately at their narrow sides, it is also possible to use a configuration according to FIG. 7c, where two strip-like light sources are arranged back to back in the slot 35i. However, it is also possible to use a configuration according to FIG. 7c in order to make the displayed character appear dark. In this case the light sources are set up in such a way that they only emit light on the wide side facing the body 1.

Figure 10A:
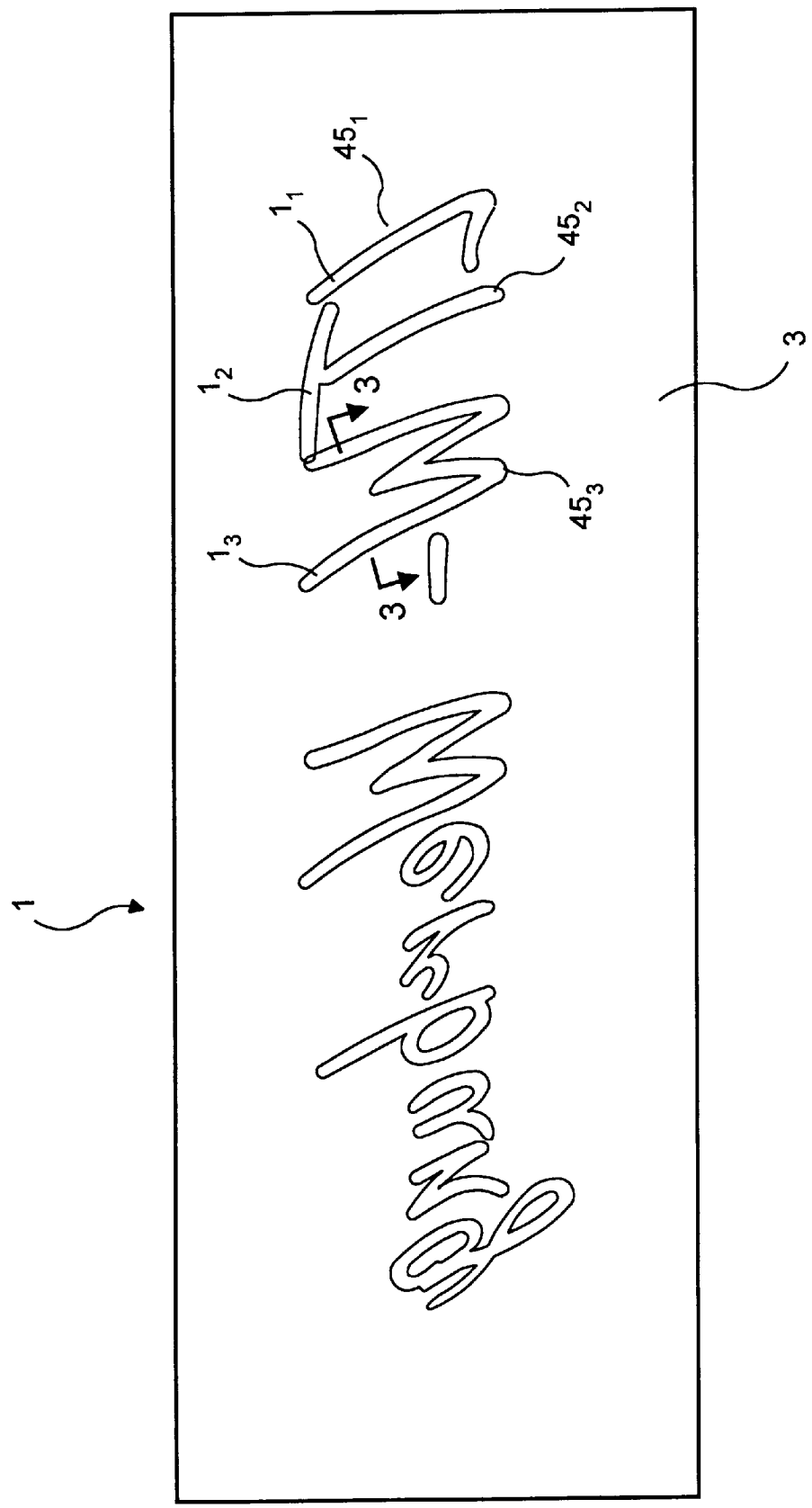

FIG. 10a shows a rear view of the second variant of the second embodiment. FIG. 10b is a part sectional view along line III—III in FIG. 10a. In this embodiment slots $45_1$ pass along the outline of mirror-symmetric characters and in each case enclose raised portions $I_i$ of the body 1, which in each case correspond to the characters to be displayed. In the slots $45_i$ are arranged strip-like light sources $46_i$, which direct light into the portions $I_i$ of the body 1, much as in the first embodiment. Alternatively the light sources $46_i$ can be set up in such a way that they only introduce light onto the lateral face of the slots $45_1$ facing the flanks of the space areas $1_i$. In this case the character stands out dark from the otherwise illuminated light exit face 2. With the embodiment of the invention shown in FIGS. 10a and 10b, the letters are not completely cut out of a transparent body as in the first embodiment (FIG. 1) and are instead merely formed in relief-like manner in said body. However, in both cases the light source passes round a body element corresponding to a character. The illumination of the space areas $1_i$ can consequently be optimized through similar measures to those described in conjunction with the first embodiment and FIGS. 1 to 7. If it is desired for the characters to stand out dark from a light background, the principles described in conjunction with FIGS. 1 to 7 are not applied to the space areas $1_i$, but instead to parts of the body located between the space areas $1_i$ and which are to be more strongly illuminated. In a further variant, instead of being formed on the mirrored back 3, the slots $45_i$ can be constructed on the light exit face 2.

For reasons of simplicity, the strip-like light sources have been represented in open slots in conjunction with the present description. However, they can also be molded and e.g. initially the slots are then constructed in the manner described, the light sources are placed therein and are then molded in the slots.

While the foregoing description and drawings represent the preferred embodiments of the present invention, it will be obvious to those skilled in the art that various changes and modifications may be made therein without departing from the true spirit and scope of the present invention.

What is claimed is:

1. A lighting device comprising:

a body;

one or more light sources for introducing light into the body;

said body light having a light exit face on one side and by which light introduced into the body passes out of the body;

said one or more light sources including at least one strip-like source made of an electroluminescent material, which continuously emits light with respect to its longitudinal direction, being directly fitted on or in the body in such a way that the light, which passes out of a side of the strip-like light source facing the body substantially completely enters said body;

said body having a lateral face being at least partly constructed as a mirror or reflector for light traveling in the body and at least partly to said light exit face.

2. The lighting device according to claim 1, wherein the wall portion constructed as a curved mirror or reflector is constructed as a collecting mirror and is adjacent to the light exit face.

3. The lighting device according to claim 1, wherein the wall portion constructed as a curved mirror or reflector is adjacent to a lateral face of the body, which reflects to the light exit face at least part of the light impinging thereon from the body.

4. The lighting device according to claim 1, wherein a reflecting arrangement with a first wall face of the body constructed as a mirror or reflector and reflecting light impinging thereon from the interior of the body at least partially to a second wall face of the body constructed as a mirror and which reflects the light impinging thereon at least partially to the light exit face.

5. The lighting device according to claim 4, wherein the first wall face of the reflecting arrangement constructed as a mirror or reflector is curved.

6. The lighting device according to claim 4, wherein the first wall face constructed as a mirror is adjacent.

7. The lighting device according to claim 1, wherein a substantially parallel face of the body, constructed in mirror or reflector form, faces the light exit face.

8. The lighting device according to claim 7, wherein two planar faces constructed as mirrors or reflectors for reflecting light travelling in the body and which are inclined with respect to one another by 90°, one of said two faces being connected to the face, constructed as a mirror or reflector and substantially parallel to the light exit face and being inclined with respect to said face.

9. The lighting device according to claim 1, the strip-like light source extends essentially in a direction parallel to the light exit face.

10. The lighting device according to claim 1, wherein the strip-like light source is so positioned that the light impinging directly from it on the light exit face has an incidence angle greater than the total reflection angle.

11. The lighting device according to claim 10, wherein the faces of the body constructed as mirrors are set up in such a way that the light reflected from them to the light exit face has on the latter an incidence angle greater than the total reflection angle and the light exit face has a portion with an irregular surface.

12. The lighting device according to claim 1, wherein the body has a substantially rotationally symmetrical shape and the light exit face is essentially perpendicular to the axis of symmetry.

13. The lighting device according to claim 1, wherein a rotationally symmetrical, conical light exit face tapering towards the interior of the body.

14. The lighting device according to claim 1, which it is constructed in the form of a character or a sequence of characters.

15. The lighting device according to claim 1, further comprising a wall portion constructed in an edge region of the body as a curved mirror, which reflects back to said light exit face light directly impinging thereon from the strip-like light source.

* * * * *